Dec. 26, 1933.　　L. X. ANTELME ET AL　　1,941,380
BRAKE FOR MOTOR VEHICLES OR THE LIKE
Filed Nov. 11, 1930
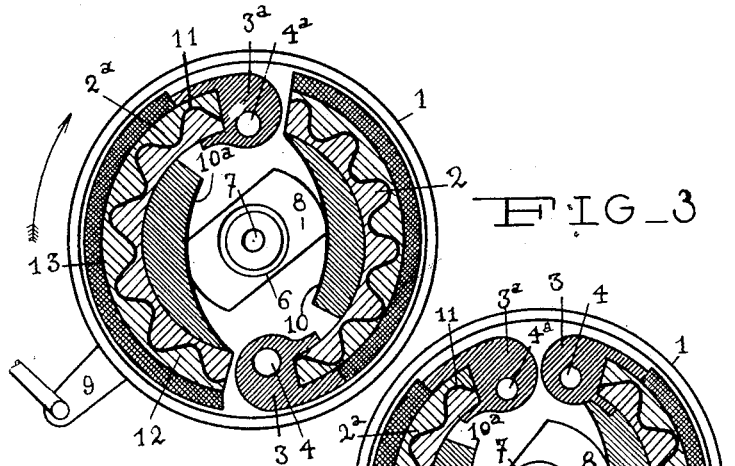
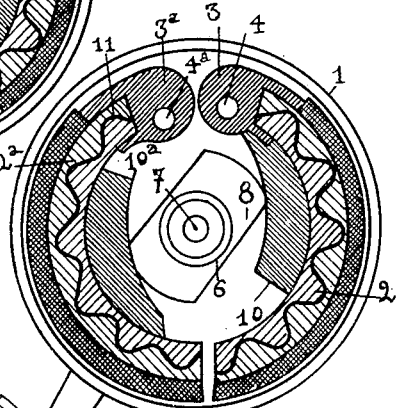
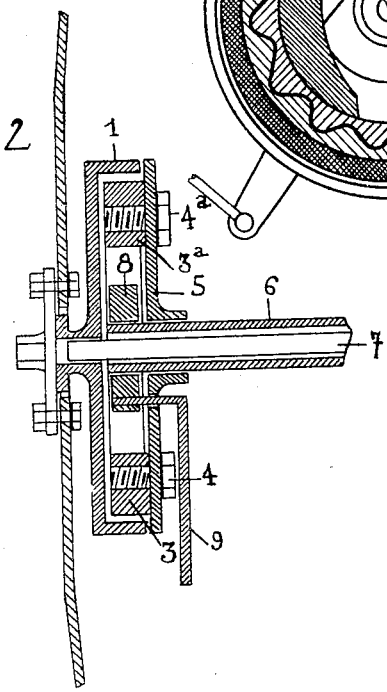
INVENTORS.
L. X. Antelme and L. Trescartes
By William C. Linton
Attorney.

Patented Dec. 26, 1933

1,941,380

UNITED STATES PATENT OFFICE 1,941,380

BRAKE FOR MOTOR VEHICLES OR THE LIKE

Louis Xavier Antelme and Leopold Trescartes, Paris, France

Application November 11, 1930, Serial No. 494,944, and in France November 15, 1929

5 Claims. (Cl. 188—78)

This invention relates to a segmental brake acting on a drum and ensuring a perfect and integral adhesion of the friction band to the braking drum. The disadvantage of brakes with commonly used segments, as is known, is that the braking surface thereof is limited to one part only of the sector constituted by each segment. This fact may be verified on any worn brake by the partial wear of the lining. This defect is due to the fact that the spreading of the segments is obtained by means of a cam eccentric with respect to the drum and acting on rigid segments rotating around a point which itself is eccentric. The fact that the segments are rigid further increases this defective action.

In the brake system forming the subject matter of this invention the segments are resilient and are constituted by an undulated spring embedded in rubber or any other material which allows them to act accurately over their whole surface against the drum. The control of these segments is effected by means of a central cam, which ensures a still more perfect adhesion of the said segments to the brake drum. The very constitution of these segments causes them, as soon as they make contact with the drum, to increase automatically the clutching effect, a fact which allows a very effective braking effort to be obtained with but a very small travel of the controlling cam. It will also be noted, that the higher the speed the more rapid is the reaction of the segments.

Another advantage resides in the fact that the segments by reason of their elasticity automatically resume their initial position and carry with them the whole of the control gear as soon as the pedal or lever is released.

In the appended drawing, which shows one of the possible constructions of the device according to the invention, by way of example only:

Fig. 1 is a vertical section of a brake taken on a plane perpendicular to the vehicle axle, Fig. 2 is a vertical section taken on a plane passing through the said axle, and Fig. 3 shows a modification of the brake.

1 denotes the brake drum, against which the segments 2 and 2ª act by friction. These segments are held by two fixed jaws 3 and 3ª rigidly secured, by means of bolts 4 and 4ª, to the cheek 5 formed on the sleeve 6 through which passes the shaft 7 which supports and drives with it the drum 1. The expanding of the segments is effected by means of the cam 8 controlled by the lever 9 which is coupled by any suitable system of rods to the brake pedal or lever of the vehicle. The cam 8 is disposed at the centre of the drum, and acts on two inclined or wedge members 10 and 10ª, which are adapted to compress the segments and to cause them to make contact with the drum 1.

The segments 2 and 2ª consist of an undulated spring 11 embedded within a body of rubber 12. On the external surface of this rubber body is secured a friction band 13 of suitable material having a high coefficient of friction.

It will thus be seen that in this brake system there is no movable member and no shaft requiring any lubrication, the movements of the segments being solely due to their inherent resiliency.

When the cam 8 is rotated to bring the friction surface of the friction band into contact with the drum, which is rotating in the direction indicated by the arrow, Fig. 1, the action of the friction tends to shorten the undulated springs 11, which are held in the jaws 3 and 3ª, thus producing a decrease in the period of the undulations, but an increase in their amplitude. The result is that the rubber body in which this spring is embedded swells and increases the pressure of the friction band against the drum. It will be understood that the higher the speed of rotation of the drum the more sudden will be the swelling of the mass and the more rapid and effective the braking action. The effort exerted on the cam and, consequently, on the brake pedal, is thus automatically amplified by the undulated spring which, in reacting against the contraction which the friction tends to impose thereon, efficiently and closely applies the whole friction surface of the friction bands to the drum.

The efficacy of this new brake is thus due to two reasons, i. e. the integral friction of the band on the drum and the automatic amplification of the force exerted on the brake pedal or lever.

Due to the uniform wear of the friction surfaces and to the taking up of any play which might occur by the controlling cam, the life of these brakes will be greatly extended without repairs or replacements of parts being necessary.

In the construction shown in Fig. 1, the efficacy of the brake will be less for reverse drive than for forward drive by reason of the basic principle upon which this brake functions. In fact, when travelling rearwardly, the undulated spring tends to extend and the pressure of the segments against the friction wall of the drum is less than when travelling forwardly.

If in certain cases, such as when utilizing it on heavy weights for example, it be necessary to have an efficient braking in both directions, the new brake may be assembled as shown in Fig. 3.

In this case the segments are mounted in opposition that is to say that the one is compressed whilst the other is extended. The braking effect is the same for forward or rearward travel.

Manifestly, the construction shown and described is capable of many modifications and such modifications as come within the scope of our claims, we consider within the spirit of our invention.—

We claim:

1. A brake comprising a brake drum, braking means consisting of inherently elastic material having an outer unelastic surface disposed in said drum adjacent the braking surface thereof, and means for applying pressure to said braking means, whereby, due to the inherent resiliency of the latter, to cause a deformation of the same for frictional engagement with the adjacent braking surface of said drum.

2. A brake comprising a brake drum, braking means consisting of a spring member embedded in a body of elastic material and disposed in said drum adjacent the braking surface thereof, and means for applying pressure to said braking means, whereby, due to the resiliency of the latter, to cause a deformation of the same for frictional engagement with the braking surface of said drum.

3. A brake comprising a brake drum, a plurality of braking segments consisting of inherently elastic material having an outer unelastic surface positioned in said drum adjacent the braking surface thereof, and means for applying pressure to said segments, whereby, due to the resiliency of the latter, to cause deformation of the same for frictional engagement with the braking surface of said drum.

4. A brake comprising a brake drum, a plurality of braking segments consisting of inherently elastic material having an outer unelastic surface disposed in said drum and arranged adjacent the inner peripheral portion thereof, and a cam disposed centrally of the drum and operable to apply pressure to said segments, whereby, due to the resiliency of the latter, to cause a deformation of the same for frictional engagement with the braking surface of said drum.

5. A brake comprising a brake drum, a pair of segments consisting of inherently elastic material having an outer unelastic surface disposed within said drum and arranged therein in opposed relation to each other, and means for applying pressure to said segments, whereby, due to the resiliency of the latter, to cause a deformation of the same for frictional engagement with the braking surface of said drum.

LOUIS XAVIER ANTELME.
LEOPOLD TRESCARTES.